United States Patent [19]

Maurer et al.

[11] Patent Number: 4,536,003
[45] Date of Patent: Aug. 20, 1985

[54] PIVOT LIMITER FOR STEERED WHEELS

[75] Inventors: Dieter Maurer; Jürgen Rauter, both of Friedrichshafen; Peter Dziuba, Überlingen, all of Fed. Rep. of Germany

[73] Assignee: Zahnradfabrik Friedrichshafen AG, Friedrichshafen, Fed. Rep. of Germany

[21] Appl. No.: 467,251

[22] Filed: Feb. 17, 1983

[30] Foreign Application Priority Data

Feb. 19, 1982 [DE] Fed. Rep. of Germany ....... 3205979

[51] Int. Cl.³ .......................... B62D 5/06; B62D 7/06; B62D 7/20
[52] U.S. Cl. .................................. 280/95 R; 180/154; 180/163; 403/4; 403/122; 403/140
[58] Field of Search ................ 180/153, 152, 154–158, 180/163, 905, 906; 280/95 A, 95 R; 403/3, 4, 77, 140, 122

[56] References Cited

U.S. PATENT DOCUMENTS 3,693,999 9/1972 Wood, Jr. ..................... 280/95 R
3,938,822 2/1976 Guerriero ..................... 280/95 R
4,187,033 2/1980 Zukowski ..................... 280/95 R X

FOREIGN PATENT DOCUMENTS 2752570 5/1931 Fed. Rep. of Germany .
1230684 12/1966 Fed. Rep. of Germany .
3015016 10/1980 Fed. Rep. of Germany .

Primary Examiner—Joseph F. Peters, Jr.
Assistant Examiner—Mitchell J. Hill
Attorney, Agent, or Firm—Karl F. Ross; Herbert Dubno

[57] ABSTRACT

A steered axle assembly comprises a relatively fixed axle beam, a pair of wheel supports pivotal on the axle beam about respective upright wheel pivot axes spaced horizontally apart on the beam transverse to a predetermined horizontal travel direction, an at least limitedly articulated track rod extending horizontally transverse to the travel direction between the wheel supports and having outer ends pivoted on same about respective upright track axes spaced in the travel direction from the respective pivot axes, and an actuator cylinder fixed to the axle beam and having a piston rod forming part of the track rod for relatively displacing the rod and axle beam horizontally transverse to the travel direction and thereby generally identically pivoting the wheel supports about the respective wheel pivot axes. Respective rod and beam abutment formations fixed on the track rod and relative to the axle beam confront each other horizontally transverse to the travel direction. A stop or spacer fixed to one of the formations is engageable horizontally perpendicular to the travel direction with the other formation for limiting pivoting of the wheel supports in one direction relative to the beam beyond an end position with the spacer engaging the other formation.

14 Claims, 13 Drawing Figures

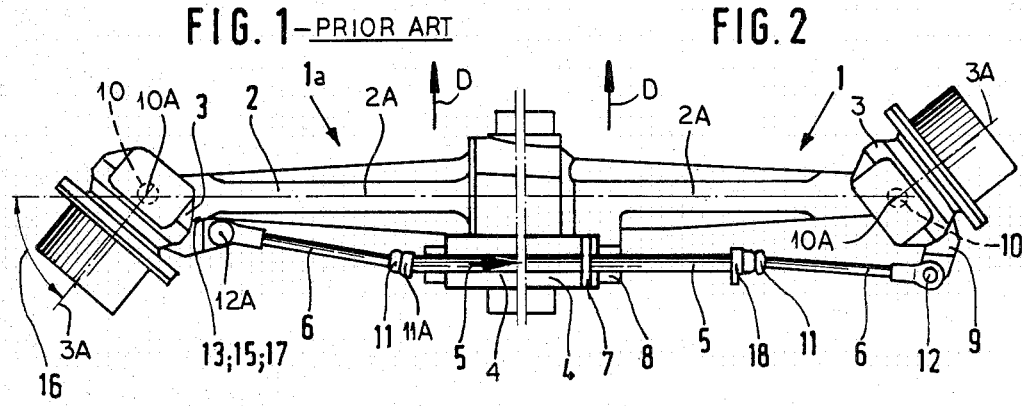
FIG. 1 - PRIOR ART　　FIG. 2
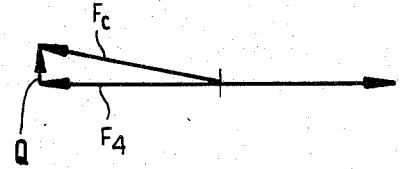　
FIG. 1A - PRIOR ART　　FIG. 2A
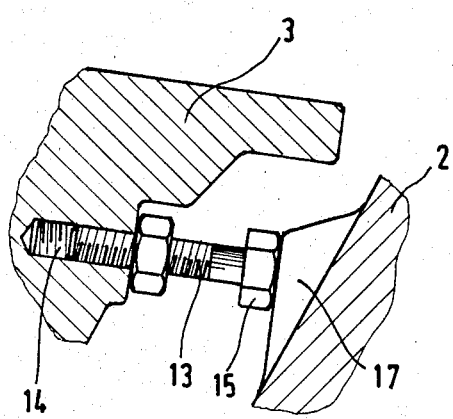　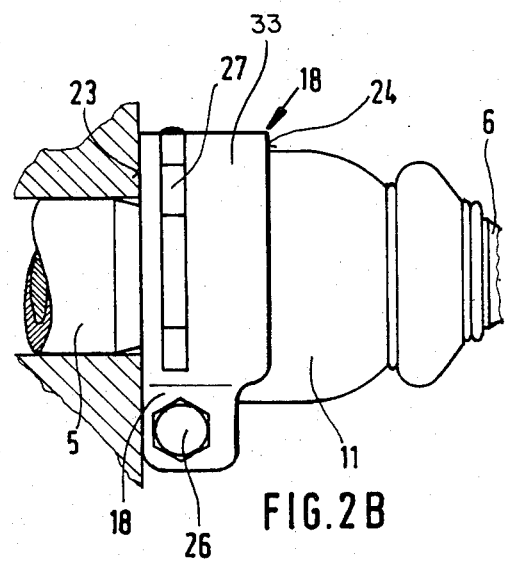
FIG. 1B - PRIOR ART　　FIG. 2B

PIVOT LIMITER FOR STEERED WHEELS

FIELD OF THE INVENTION

The present invention relates to a steered-wheel axle assembly. More particularly this invention concerns an arrangement for limiting the pivoting of the wheels in such an assembly.

BACKGROUND OF THE INVENTION

A steered axle assembly normally has a relatively fixed axle member or beam on which a pair of wheel supports are pivotal about respective upright wheel pivot or king-pin axes spaced horizontally apart on the beam generally perpendicular to a predetermined horizontal travel direction. A track rod extends horizontally transverse, that is generally perpendicular, to the travel direction between the wheel supports and has outer ends pivoted on same about respective upright track axes spaced in the travel direction from the respective pivot axes. An actuator, either a steering box or a hydraulic or pneumatic booster, has an output element connected to the track rod between the track axes for displacing the rod horizontally generally perpendicular to the travel direction and thereby generally identically pivoting the wheel supports about the respective wheel pivot axes.

As originally manufactured this equipment invariably allows the wheel supports to pivot through a much greater arc than is in practice permissible. The extent of pivot of the wheel supports is limited to prevent the tires from coming into contact with the adjacent structure of the vehicle, for instance the inside of the wheel well or the fender.

Thus the standard system simply provides respective abutments or bumps formed on the axle beam adjacent the wheel supports and facing generally tangentially of the respective wheel pivot axes. These supports in turn are each formed with a tangentially extending threaded bore receiving an adjustment bolt having a head engageable with a respective abutment in a respective end position of the wheel supports. The bolts can be screwed out from the wheel supports to decrease the turning arc in the respective direction, or screwed in to increase it. Lock nuts are provided to secure the bolts in the set positions.

Setting or changing the adjustment in such an arrangement is quite difficult. Assuming the pivot arc is to be reduced, the wheels are cramped all the way in one direction to the desired end point, and then the one bolt is screwed out until it touches its abutments, whereupon it is locked in place. The wheels are then oppositely pivoted and the operation is performed at the other end of the axle. This operation must be carried out whenever tire or wheel size is changed, as is common on large pieces of equipment. If it is not done valuable tires and the vehicle both can be damaged, particularly in systems wherein a heavy-duty actuator provides all of or boosts the steering force.

The adjustment bolts are quite inaccessible, especially when the respective wheel is in a cramped-over end position. In addition adjustment is continuous, so that each adjustment must be painstakingly executed to assure uniform results. The adjustment mechanism itself is in a location where it is subject to much fouling, so the bolts frequently become badly frozen in place. The transversely effective vector of force on the bolts can bend them, and it is also simply possible for them to vibrate loose and become maladjusted.

OBJECTS OF THE INVENTION

It is therefore an object of the present invention to provide an improved steered-wheel axle assembly.

Another object is the provision of an adjustment mechanism for such a steered-wheel axle assembly which overcomes the above-given disadvantages.

A yet further object is to provide an adjustment mechanism which can be set easily, and which can be constructed to give several standard pivot settings that can be established easily even by a relatively unskilled mechanic.

SUMMARY OF THE INVENTION

These objects are attained according to the instant invention is a steered axle assembly comprising, as is known, a relatively fixed axle member, a pair of wheel supports pivotal on the axle member about respective upright wheel pivot axes spaced horizontally apart on the member transverse to a predetermined horizontal travel direction, an at least limitedly articulated track rod extending horizontally transverse to the travel direction between the wheel supports and having outer ends pivoted on same about respective upright track axes spaced in the travel direction from the respective pivot axes, and actuator means fixed to the axle member and having an output element connected to the track rod between the track axes for relatively displacing the rod and axle member horizontally transverse to the travel direction and thereby generally identically pivoting the wheel supports about the respective wheel pivot axes. According to this invention respective rod and member abutment formations fixed on the track rod and relative to the axle member confront each other horizontally transverse to the travel direction. Means including a spacer fixed to one of the formations is engageable horizontally perpendicular to the travel direction with the other formation for limiting pivoting of the wheel supports in one direction relative to the member beyond an end position with the spacer engaging the other formation.

With this system it is therefore possible to establish set spacings, ones that are not dependent on play in the various pivots connected between the actuator and the wheel supports. A relatively unskilled mechanic can make the necessary adjustment without fear of loosing shims of being slightly off on the setting. Since the stop is provided on the output element of the actuator, it does not subject the entire system to bending, as is the case when the stop is between the wheel support and the axle-beam end. The system can be mounted virtually at the actuator, reducing fabrication costs for the wheel supports and eliminating extra parts in the arrangement. The location of the stops is much more convenient to work on than the prior-art arrangements, and is less susceptible of fouling from water, mud, and the like. What is more, the arrangement makes it very easy to set different maximum angular deflections for the two steered wheels, as is necessary in some cases where unlike tires or wheels are used for particular applications.

According to another feature of this invention the spacer is U-shaped, has a pair of end faces directed oppositely parallel to the rod and spaced differently from the one formation, and can be mounted on the one formation in one position with one of the faces turned toward and engageable with the other formation and in another position with its other face turned toward and engageable with the other formation. In addition means is provided for releasably securing the spacer to the one formation in either of its positions. Thus a single spacer can be used to set two different deflections.

In accordance with a feature of the present invention the other formation is an end surface of the actuator means, which itself is normally a hydraulic cylinder mounted on the axle member between the wheel supports and having a piston fixed to the output element. In this manner the stop is effective right at the source of the force it is controlling.

The assembly according to this invention also has second such respective rod and member abutment formations fixed on the track rod and relative to the axle member and confronting each other horizontally transverse to the travel direction and means including a second such spacer fixed to one of the second formations and engageable horizontally perpendicular to the travel direction with the other second formation for limiting pivoting of the wheel supports in a direction opposite the one direction relative to the member beyond another end position with the second spacer engaging the other second formation. This allows the extent of deflection for the two wheels to be controlled independently. Each spacer or stop controls the limit for the opposite wheel.

As mentioned above, the actuator means includes a fluid-powered cylinder mounted on the axle member between the wheel supports and having a piston rod forming the output element and formed with the one formation. The one formation is an annular groove and the spacer is a U-section washer engageable over the groove. This washer can be provided with a spring or itself be elastically deformable to resiliently engage the output element. Thus the unit will hold when mounted in position.

According to further features of this invention the washer is provided with a U-shaped collar having a pair of end faces directed oppositely parallel to the rod and spaced differently from the groove, and can be mounted on the groove in one position with one of the faces turned toward and engageable with the other formation and in another position with its other face turned toward and engageable with the other formation. It is also possible to make the unit simpler by using a spacer which has a U-shaped flange projecting parallel to the rod from the groove. Either way, the spacer has a pair of legs and further includes a retaining element engageable between the legs and in the groove and means for securing the retaining element to the legs. This means can be a simple a bolt passing between the legs and through the retaining element. In addition the retaining element is a flat plate generally coplanar with the washer. Such structure is extremely easy for even a relatively inept mechanic to work on.

According to another feature of this invention the groove is of polygonal shape having at least two pairs of opposite sides at different spacings from each other. Thus washers having different effective lengths and cutouts of different widths corresponding to the different spacings can be fitted in respective angularly offset positions over the groove.

It is also possible in such an arrangement for one of the formations to be stepped with respect to the other formation. Such structure allows a single stop to create quite a few different settings.

DESCRIPTION OF THE DRAWING

The above and other features and advantages will become more readily apparent from the following, reference being made to the accompanying drawing in which:

FIG. 1 is a top view of the left-hand side of a prior-art axle assembly;

FIG. 1A is a diagram illustrating functioning of the prior-art assembly of FIG. 1;

FIG. 1B is a large-scale view of a detail of the prior-art assembly of FIG. 1;

FIG. 2 is a top view of the right-hand side of the axle assembly according to the present invention;

FIG. 2A is a diagram illustrating functioning of the assembly according to this invention;

FIG. 2B is a large-scale view of a detail of the assembly of FIG. 2;

SPECIFIC DESCRIPTION

Figure 3:
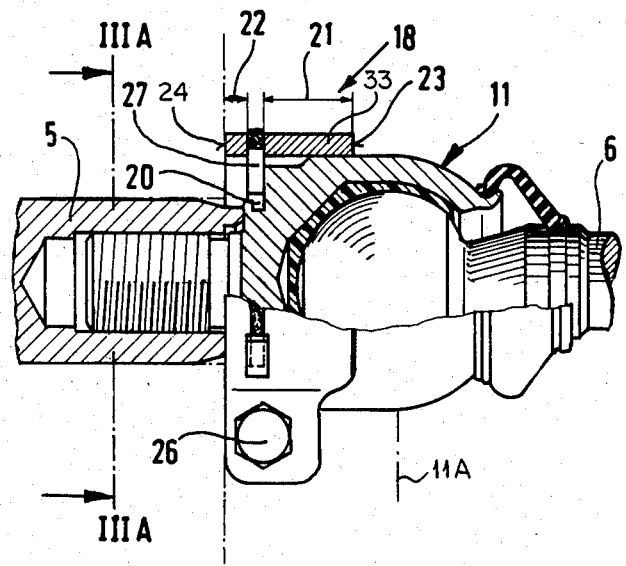
FIG. 3 is a side view partly in axial section through the detail of FIG. 2B.

As seen in FIG. 1, a prior-art axle assembly 1a has a standard axle beam 2 on whose left-hand end a wheel hub or support 3 is pivoted at a king-pin joint 10 about an upright axis 10A. The support 3 is centered as is usual on the wheel rotation axis 3A that is horizontal like the axis 2A and that normally comes at least close to intersecting same at the upright axis 10A. Centrally the beam 2 carries a hydraulic actuator 4 having a piston 7 (FIG. 2) horizontally movable perpendicular to a normal travel direction D. This piston rod 5 is connected at a ball-and-socket swivel joint 11 to the inner end of a rigid link 6 whose outer end is secured at a pivot 12 defining a track axis 12A parallel to the axis 10A of a track arm 9 projecting from the wheel support 3. The piston rod 5, joints 11, and links 6, together form a track rod. Of course the right-hand side of the beam 2 is similarly constituted.

With this system the vehicle is steered by means of the actuator 4 which can lever the housings 3 back and forth by means of the links 6 acting at the eccentric track axes 12A on the arms 9. This operation is standard.

As best seen in FIG. 1b the extent of deflection of this left-hand wheel support 3 for a left-hand turn, indicated by the angle 16, is established by the interaction of a bolt 13 screwed into a threaded bore 14 of the support 3 and having a head 15 engageable with a bump 17 formed on the end of the axle beam 2. This bolt 13 extends generally perpendicular to the plane defined by the two axes 10A and 12A.

Access to the bolt 14 and its locking nut is extremely difficult, and it is placed in a location where it is likely to become fouled. In addition the bolt 13 can vibrate loose, and complex equipment is needed to determine just how to set it.

With this system the axially directed force coming from the actuator 4 and indicated at $F_4$ must be effective through the joint 12 as a composite force $F_c$ partly formed by a transverse component Q. This means that the two joints 11 and 12 must transmit all this force, and some of its laterally, which puts a considerable strain on these elements. The actuator 4 can exert enormous pressures so this strain can be very great.

The instant invention, as shown in FIG. 2 where identical reference numerals refer to identical structure, does not employ the arrangement shown in FIG. 1B. This axle assembly 1 comprises, at its simplest, stops 18 fixed on the outer ends of the piston rod 5 and engageable with end abutment surfaces 8 of the actuator cylinder 4. Force transmission between each such stop 18 is therefore along line $F_4$ shown in FIG. 2A, that is perfectly straight with no lateral vector Q. Thus the joints 11 and 12 will not have to transmit the full force of the cylinder 4 when the respective wheel support 3 is at the end of its pivotal travel, thereby sparing these elements considerable strain. Instead this force is transmitted straight through the stop 18 to the axle beam 2. The force is exerted wholly as tension and compression, so that even if it is relatively great it can be withstood by standard materials and machine elements.

Figure 3A:
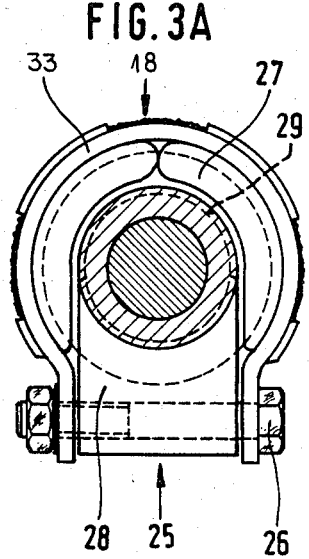
FIG. 3A is a section taken along line IIIA—IIIA of FIG. 3.

As better shown in FIGS. 2, 3, and 3A the stop 13 is fitted to a seat or groove 20 formed in the socket part of the joint 11. It comprises a U-shaped washer 27 engaged in this groove 20 and lying in a plane perpendicular to the axis of the rod 5. This washer 27 is received in a U-section flange or loop 33 having axially opposite end abutment faces 23 and 24 spaced different distances 21 and 22 from the plane of the washer 27. The entire loop 33 must be elastically spread somewhat to fit the washer 27 to the groove 20, so that it holds somewhat resiliently in place. The space 25 between the legs of the loop 33 is closed by a plate 28 having a part-circular edge fitted in the groove 20. A bolt 26 extends between these legs and passes through a passage in the plate 28 to lock the entire stop 18 tightly on the rod 5.

With this system the distance along the rod 5 between the outer shoulder of the groove 20 and the confronting end surface 8 of the actuator 4 establishes the maximum possible deflection toward the side of the opposite wheel support 3. When the stop 18 is positioned as shown in FIG. 3 with its close end 24 turned toward the actuator 4, this distance is reduced by the distance 22 plus the thickness of the washer 27.

The setting is changed by
removing the bolt 26,
taking out the plate 28,
removing the washer 27 and its loop 33 and reversing them 180° and
replacing the plate 28 and bolt 26. This brings the more remote end face 23 of the stop 18 into a position confronting and engageable with the end 8 of the actuator 4. Thus three separate positions can be established. One with no spacer or stop, one with the spacing 21 and one with the spacing 22.

In this arrangement the washer 26 is actually formed of two arcuate steel plates secured by tabs in the resiliently deformable steel holder loop 33. The plate 28 is of the same thickness as the washer 27 so that when the bolt 26 is in place the stop 18 can transmit very large forces. This is advantageous because, as mentioned above, it reduces the strain on the joints 11 and 12.

With this system it is therefore possible to set the maximum pivotal travel of the wheel supports 3 by limiting the maximum excursion of the piston rod 5. The stops 18 are mounted in a region that is relatively accessible and not exposed to fouling so that changing the pivotal travel of the supports 3 is not difficult. In addition the fixed lengths 21 and 22 allow exact settings to be determined relatively easily and accurately.

Figure 4:
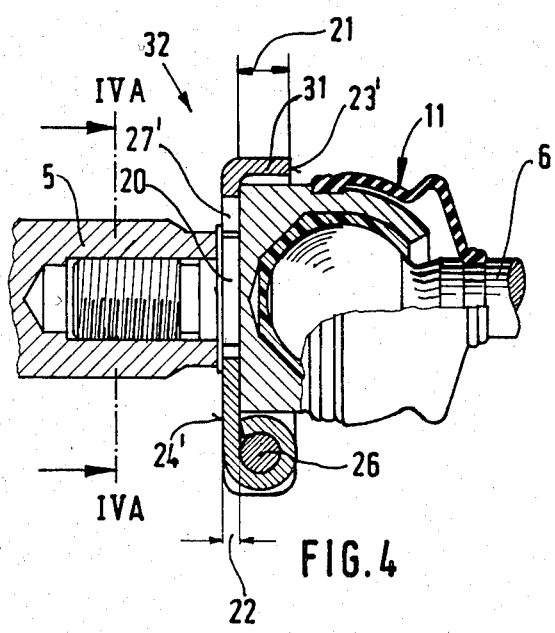
FIG. 4 is a side view partly in axial section through a detail of another arrangement according to this invention.
Figure 4A:
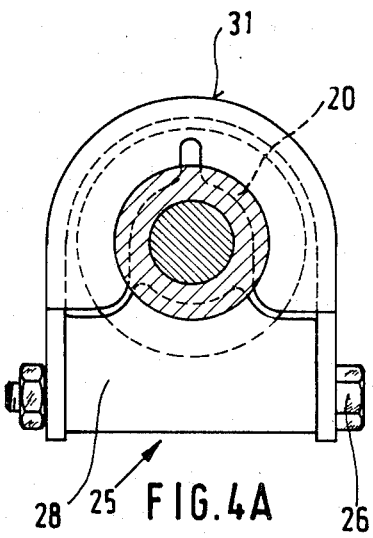
FIG. 4A is a section taken along line IVA—IVA of FIG. 4.

The arrangement of FIGS. 4 and 4A has a stop 1 formed of a single L-section element having a flange 27' equivalent to the washer 27 and a flange 31 extending in one direction therefrom and having an end face 23' spaced a distance 21 from the outer shoulder or wall of the groove 20. The opposite end face 24' is spaced the distance 22 equal to the groove width from this location. This arrangement can be reversed in much the same manner as that of FIGS. 3 and 3A to give two different settings.

Figure 5:
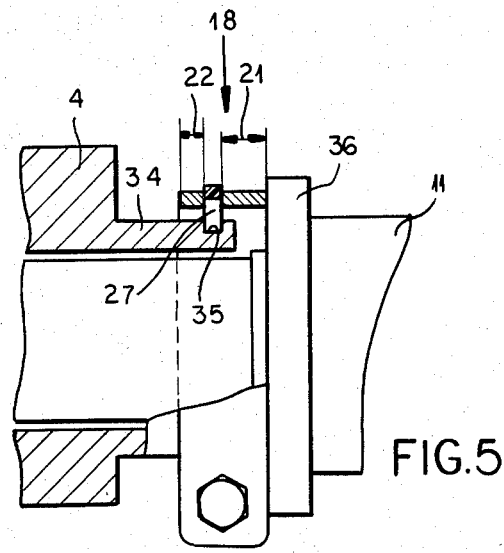
FIG. 5 is a side view partly in axial section through a detail of another arrangement in accordance with the present invention.

It is also possible as shown in FIG. 5 to mount the stop 18 on an extension 34 formed with a groove 35 identical to the groove 20. This stop is, therefore, engageable with a flange 36 formed on the part of the joint 11 fixed on the rod 5. With this system therefore the stop 18 does not reciprocate with the rod 5.

Figure 7:
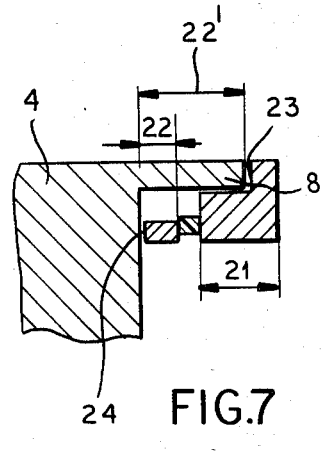
FIGS. 6 and 7 are views like FIGS. 4A and 5, respectively, of other respective arrangements of the invention.
Figure 6:
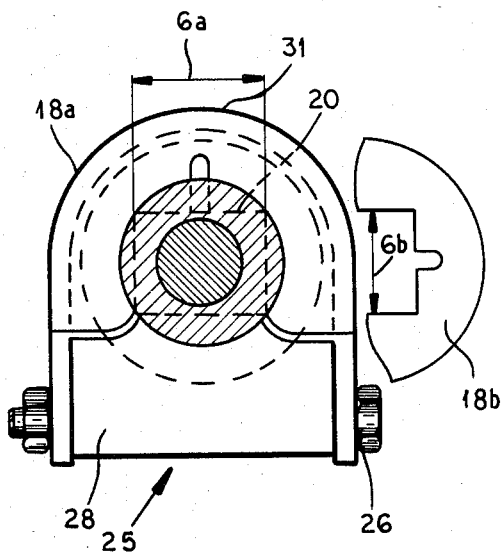

Should more than three different settings be needed, it is possible as shown in FIG. 6 to make the groove 20 polygonal, that is square or hexagonal. In this manner different stops $18a$ and $18b$ with cutouts 26 of different widths $b_a$ and $b_b$ can be used, each having a different axial spacing to its end faces. It is also possible as seen in FIG. 7 to step the rod or the cylinder end 8. In this manner a single stop 18 can be differently positioned to give more than three different settings 21, 22, and 22'. With a square shape four and with a hexagonal shape six different spacings are possible.

It is also possible without leaving the scope of this invention for the stop to be mounted right in the cylinder 4 and even to act on end or limit valves that control this actuator in a well known manner. The system according to this invention can also be used in other than steering systems, or in steering systems that are not power-operated or assisted as shown here.

Under any circumstances the arrangement according to this invention is easy to work on, and allows accurate settings to be made easily. It further relieves other elements of the steering assembly from strain while itself functioning better than the prior-art systems.

We claim:
1. A steered axle assembly comprising:
a relatively fixed axle member;
a pair of wheel supports pivotal on the axle member about respective upright wheel pivot axes spaced horizontally apart on the member transverse to a predetermined horizontal travel direction;
an at least limitedly articulated track rod extending horizontally transverse to the travel direction between the wheel supports and having outer ends pivoted on the respective wheel supports about respective upright track axes spaced in the travel direction from the respective pivot axes;
actuator means fixed to the axle member and connected to the track rod between the track axes for relatively displacing the rod and axle member horizontally transverse to the travel direction and thereby generally identically pivoting the wheel supports on the axle member about the respective wheel pivot axes;
a rod abutment formation fixed on the track rod;

a member abutment formation fixed on the axle member and confronting the rod abutment formation horizontally transverse to the travel direction; and means including a spacer releasably fixed to one of the formations and engageable horizontally perpendicular to the travel direction with the other formation for limiting pivoting of the wheel supports in one direction relative to the member beyond an end position with the spacer engaging the other formation.

2. The steered axle assembly defined in claim 1 wherein the other formation is an end surface of the actuator means.

3. The steered axle assembly defined in claim 1, further comprising second such respective rod and member abutment formations fixed on the track rod and relative to the axle member and confronting each other horizontally transverse to the travel direction; and means including a second such spacer fixed to one of the second formations and engageable horizontally perpendicular to the travel direction with the other second formation for limiting pivoting of the wheel supports in a direction opposite the one direction relative to the member beyond another end position with the second spacer engaging the other second formation.

4. A steered axle assembly comprising:

a relatively fixed axle member;

a pair of wheel supports pivotal on the axle member about respective upright wheel pivot axes spaced horizontally apart on the member transverse to a predetermined horizontal travel direction;

an at least limitedly articulated track rod extending horizontally transverse to the travel direction between the wheel supports and having outer ends pivoted on the respective wheel supports about respective upright track axes spaced in the travel direction from the respective pivot axes;

actuator means fixed to the axle member and connected to the track rod between the track axes for relatively displacing the rod and axle member horizontally transverse to the travel direction and thereby generally identically pivoting the wheel supports on the member about the respective wheel pivot axes;

a rod abutment formation fixed on the track rod; a member abutment formation fixed on the axle member and confronting the rod abutment formation horizontally transverse to the travel direction; and means including a spacer fixed to one of the formations and engageable horizontally perpendicular to the travel direction with the other formation for limiting pivoting of the wheel supports in one direction relative to the member beyond an end position with the spacer engaging the other formation, the spacer being U-shaped, having a pair of end faces directed oppositely parallel to the rod and spaced differently from the one formation, and being mountable on the one formation in one position with one of the faces turned toward and engageable with the other formation and in another position with its other face turned toward and engageable with the other formation.

5. The steered axle assembly defined in claim 2, further comprising means for releasably securing the spacer to the one formation in either of its positions.

6. A steered axle assembly comprising:

a relatively fixed axle member;

a pair of wheel supports pivotal on the axle member about respective upright wheel pivot axes spaced horizontally apart on the member transverse to a predetermined horizontal travel direction;

an at least limitedly articulated track rod extending horizontally transverse to the travel direction between the wheel supports and having outer ends pivoted on the respective wheel supports about respective upright track axes spaced in the travel direction from the respective pivot axes;

actuator means fixed to the axle member and connected to the track rod between the track axes for relatively displacing the rod and axle member horizontally transverse to the travel direction and thereby generally identically pivoting the wheel supports on the member about the respective wheel pivot axes, the actuator means including a hydraulic cylinder mounted on the axle member between the wheel supports and having a piston forming part of the track rod;

a rod abutment formation fixed on the track rod;

a member abutment formation fixed on the axle member and confronting the rod abutment formation horizontally transverse to the travel direction; and means including a spacer fixed to one of the formations and engageable horizontally perpendicular to the travel direction with the other formation for limiting pivoting of the wheel supports in one direction relative to the member beyond an end position with the spacer engaging the other formation.

7. The steered axle assembly defined in claim 6 wherein a piston rod of said piston has the one formation.

8. The steered axle assembly defined in claim 7 wherein the one formation is an annular groove and the spacer is a U-section washer engageable in the groove and having a pair of legs.

9. The steered axle assembly defined in claim 8 wherein the washer is provided with a U-shaped collar having a pair of end faces directed oppositely parallel to the rod and spaced differently from the groove, and can be mounted in the groove in one position with one of the faces turned toward and engageable with the other formation and in another position with its other face turned toward and engageable with the other formation.

10. The steered axle assembly defined in claim 8 wherein the spacer has a U-shaped flange projecting parallel to the rod from the groove.

11. The steered axle assembly defined in claim 8 wherein the spacer has a pair of legs and further includes a retaining plate engageable between the legs and in the groove; and means for securing the retaining plate to the legs.

12. The steered axle assembly defined in claim 11 wherein the securing means is a bolt extending between the legs and through the retaining plate.

13. The steered axle assembly defined in claim 12 wherein the plate is generally coplanar with the washer.

14. The steered axle assembly defined in claim 8 wherein the groove is of polygonal shape having at least two pairs of opposite sides at different spacings from each other, whereby washers having different effective lengths and cutouts of different widths corresponding to the different spacings can be fitted in respective angularly offset positions over the groove.

* * * * *